United States Patent [19]

Andrews et al.

[11] 3,912,566
[45] Oct. 14, 1975

[54] METHOD FOR BONDING SURFACES TOGETHER USING A MIXTURE OF AN EPOXIDE RESIN, A POLY(AMINOAMIDE) AND BLOCKED ISOCYANATE PREPOLYMER

[75] Inventors: Christopher Michael Andrews, Cambridge; Bryan Dobinson, Duxford; Edward William Garnish, Saffron Waldon; Bernard Peter Stark, Stapleford; Robert George Wilson, Cambridge, all of England

[73] Assignee: Ciba-Geigy Corporation, Ardsley, N.Y.

[22] Filed: Sept. 10, 1973

[21] Appl. No.: 395,864

[30] Foreign Application Priority Data
Sept. 18, 1972 United Kingdom............... 43190/72

[52] U.S. Cl. ................ 156/330; 156/331; 161/184; 260/830 P
[51] Int. Cl. .......................... C09j 5/00; B32b 27/38
[58] Field of Search ............ 156/330, 331; 161/184; 260/830 P

[56] References Cited
UNITED STATES PATENTS

| | | | |
|---|---|---|---|
| 3,321,548 | 5/1967 | Sattler................................ | 260/829 |
| 3,423,270 | 1/1969 | Heins.................................. | 156/330 |
| 3,474,056 | 10/1969 | Schneider et al...................... | 260/18 |
| 3,494,888 | 2/1970 | McElroy.............................. | 260/47 |
| 3,503,845 | 3/1970 | Hollatz et al. ....................... | 161/184 |

*Primary Examiner*—Charles E. Van Horn
*Assistant Examiner*—Robert A. Dawson
*Attorney, Agent, or Firm*—Vincent J. Cavalieri

[57] ABSTRACT

Surfaces bonded together by means of a tacky adhesive composition which comprises
a. an epoxide resin having, per average molecule, more than one 1,2-epoxide group of formula

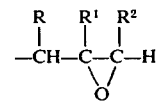

directly attached to oxygen, sulfur, or nitrogen, where either R and $R^2$ each represent hydrogen, in which case $R^1$ denotes hydrogen or methyl, or R and $R^2$ together represent —$CH_2CH_2$—, in which case $R^1$ denotes hydrogen,
b. a poly(aminoamide), and
c. a blocked isocyanate prepolymer.

10 Claims, No Drawings

METHOD FOR BONDING SURFACES TOGETHER USING A MIXTURE OF AN EPOXIDE RESIN, A POLY(AMINOAMIDE) AND BLOCKED ISOCYANATE PREPOLYMER

This invention relates to a method of bonding surfaces together by means of adhesive compositions based on epoxide resins, and to structures prepared by that method.

The usefulness and versatility of epoxide resin adhesive compositions are well known. Such compositions are made up of two essential constituents, the epoxide resin (i.e., a substance containing more than one 1,2-epoxide group per average molecule) and a catalyst or curing agent which causes the epoxide resin to cross-link or itself reacts with the resin, these constituents reacting to form a strong solid having a high specific adhesion to a wide variety of substrates. Particularly useful adhesives are those that cure at room temperature, say 25°C, or at moderate temperatures, say below 60°C.

Most epoxide resin adhesive compositions hitherto available lack "green strength", that is, they are not tacky before they solidify, and surfaces to be bonded to each other by the adhesive must be held together by jigs, clips, presses, or other temporary fasteners whilst solidification takes place. Attempts have been made to overcome this disadvantage, such as by dissolving certain high-molecular weight polymers in one or more components of the composition to act as a tackifier. In general, such compositions suffer from the drawback that the blend of the added polymer and the epoxide resin is viscous and becomes tacky too rapidly, leading to difficulties in mixing it with other constituents of the compositions or in applying it in a layer. To counter this, volatile solvents could be incorporated, but the solvent-containing compositions cannot always be spread in layers of the desired thickness, the solvent may attack the object to be bonded, and many types of solvents introduce flammability or toxicity hazards into the workshop.

It is known that poly(aminoamides) react with polyisocyanates to form products useful as surface coatings. The use of the poly(aminoamides) with phenol-blocked isocyanate prepolymers is also known, the poly(aminoamide) inducing liberation of the phenol. Since the presence of phenol in surface coatings is usually undesirable, it has been proposed to remove this phenol by heating to volatilise it or by adding an epoxide resin to react with it (Götze, Schweizer Archiv, August 1960, 304–311).

We have now found that the desired objective of producing an epoxide resin adhesive which can easily be mixed, dispensed, and spread and which will become tacky in use, may be achieved, without the need to add a volatile solvent, by employing certain combinations of epoxide resins, blocked isocyanate prepolymers, and poly(aminoamides). That these combinations would be useful as adhesives which have the valuable property of developing tack was not obvious from the prior are cited above.

The present invention accordingly provides a method for bonding surfaces together which comprises sandwiching between, and in contact with, the surfaces a tacky adhesive composition comprising a. an epoxide resin having, per average molecule, more than one 1,2-epoxide group of formula

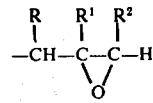

directly attached to oxygen, sulphur, or nitrogen, where either R or $R^2$ each represent hydrogen, in which case $R^1$ denotes hydrogen or methyl, or R and $R^2$ together represent $-CH_2CH_2-$, in which case $R^1$ denotes hydrogen, b. a poly(aminoamide), and
c. blocked isocyanate prepolymer, and allowing the composition to cure.

A feature of this invention is that the compositions cure rapidly through the reaction of the poly(aminoamide) with the blocked isocyanate to yield a rubbery adhesive, which is sufficiently strong for many purposes, in an extremely short time (typically, in less than 1 hour and often in less than 15 minutes) and which subsequently increases in strength due to reaction of the poly(aminoamide) with the polyepoxide to give the high strength normally associated with epoxide resin adhesives.

Another advantage may stem from release of the blocking agent from the isocyanate prepolymers. The preferred blocking agents are acidic in nature, e.g., phenols and mercaptans, and these accelerate curing of the polyepoxide by the poly(aminoamide).

In the usual methods of manufacturing epoxide resins, mixtures of compounds of differing molecular weight are obtained, these mixtures ordinarily containing a proportion of compounds whose epoxide groups have undergone partial hydrolysis. The average number of 1,2-epoxide groups per molecule of the resin need not be an integer of at least 2; it is generally a fractional number but must in any case be greater than 1.0.

Examples of resins which may be used are polyglycidyl and poly($\beta$-methylglycidyl) esters obtainable by reaction of a substance containing two or more carboxylic acids groups with epichlorohydrin, glycerol dichlorohydrin, or $\beta$-methylepichlorohydrin in the presence of alkali. Such esters may be derived from aliphatic carboxylic acids, e.g., oxalic acid, succinic acid, adipic acid, sebacic acid, and dimerised or trimerised linoleic acid, from cycloaliphatic carboxylic acids such as hexahydrophthalic acid, 4-methylhexahydrophthalic acid, tetrahydrophthalic acid, and 4-methyltetrahydrophthalic acid, and from aromatic carboxylic acids such as phthalic acid, isophthalic acid, and terephthalic acid.

Other epoxide resins which may be used include polyglycidyl and poly($\beta$-methylglycidyl) ethers, such as those obtainable by reaction of a substance containing at least two alcoholic hydroxyl groups or at least two phenolic hydroxyl groups, with the appropriate epichlorohydrin or glycerol dichlorohydrin under alkaline conditions or, alternatively, in the presence of an acidic catalyst with subsequent treatment with alkali. Such ethers may be derived from aliphatic alcohols, for example, ethylene glycol, diethylene glycol, triethylene glycol, and higher poly(oxyethylene) glycols, propylene glycol and poly(oxypropylene) glycols, propane-1,3-diol, butane-1,4-diol, pentane-1,5-diol, hexane-1,6-diol, hexane-1,2,6-triol, glycerol, 1,1,1-trimethylolpropane, and pentaerythritol; from cycloaliphatic alcohols such as quinitol, 1,1-bis(hydroxymethyl)cyclohex-3-ene, bis(4-hydroxycyclohexyl)methane, and 2,2-bis(4-hydroxycyclohexyl)propane; and from alcohols containing aromatic nuclei, such as N,N-bis(2-hydroxyethyl) aniline and 4,4-bis(2-hydroxyethylamino)diphenylmethane. Preferably the ethers are polyglycidyl ethers of an at least dihydric phenol, for example, resordinol, catechol, hydroquinone, bis(4-hydroxyphenyl)methane, 1,1,2,2-tetrakis(4hydroxyphenyl)ethane, 4,4'-dihydroxydiphenyl, bis(4-hydroxyphenyl) sulphone, phenol-formaldehyde and cresol-formaldehyde novolac resins, 2,2-bis(4-hydroxyphenyl)propane (otherwise known as bisphenol A), and 2,2-bis(3,5-dibromo-4-hydroxyphenyl)propane.

There may further be employed poly(N-glycidyl) and poly(N-β-methylglycidyl) compounds, for example, those obtained by dehydrochlorination of the reaction products of the epichlorohydrin and amines containing at least two hydrogen atoms directly attached to nitrogen, such as aniline, n-butylamine, bis(4-aminophenyl)methane, bis(4-aminophenyl) sulphone, and bis(4-methylaminophenyl)methane. Other poly(N-glycidyl) compounds that may be used include triglycidyl isocyanurate, N,N'-diglycidyl derivatives of cyclic alkylene ureas such as ethyleneurea and 1,3-propyleneurea, and N,N'-diglycidyl derivatives of hydantoins such as 5,5-dimethylhydantoin.

Compounds of formula I in which R and $R^1$ together represent $-CH_2CH_2-$ and $R^1$ denotes hydrogen include bis(2,3-epoxycyclopentyl) ether, 2,3-epoxycyclopentyl glycidyl ether, and 1,2-bis(2',3'-epoxycyclopentyloxy)-ethane.

Especially suitable epoxide resins are polyglycidyl ethers of 2,2-bis(4-hydroxyphenyl)propane or of a novolac from phenol (which may be substituted in the ring by chlorine or a hydrocarbon alkyl group of from 1 to 4 carbon atoms) and formaldehyde, having an epoxide content of at least 1.0 epoxide equivalent per kilogram.

The poly(aminoamides) are substances containing on average at least three amino-hydrogen atoms per molecule and are obtainable in a known manner by the reaction of a polyalkylenepolyamine having at least four amino-hydrogen atoms per molecule with an at least dicarboxylic acid (or an amide-forming derivative thereof, i.e., a derivative in which carboxyl groups are replaced by groups, such as carbalkoxy groups each of two to six carbon atoms, which react with a primary or secondary amine to produce amide groups).

Suitable polyalkylenepolyamines are diethylenetriamine and triethylenetetramine, and their 1,2-propylene homologues. The carboxylic acid is preferably a dimerised or trimerised ethylenically-unsaturated aliphatic monocarboxylic acid, such as linoleic acid; it may be modified by incorporation of styrene or other aromatic vinyl compound during oligomerisation, so forming an araliphatic acid.

Ordinarily, the poly(aminoamide) is present in a quantity sufficient to supply from 0.8 to 1.2 amino-hydrogen atoms per 1,2-epoxide group of the epoxide resin.

Isocyanate prepolymers which are "blocked" (sometimes said to be "capped") are, in general, known substances, and are obtainable by reaction of an isocyanate prepolymer with a blocking agent. The blocking agent is one displaceable, under the conditions employed, by a poly(aminoamide) and the preferred agents are, as already indicated, those containing one or more weakly acidic hydrogen atoms, such as monohydric phenols and mono- or di-mercaptans.

The preferred blocked isocyanate prepolymers are obtainable by the reaction of an organic compound containing two isocyanate groups per molecule with a substance containing two or three alcoholic hydroxyl or aliphatic mercaptan groups. They may be represented by the formula $$(OCN.R^3.NHCOX)_nR^4$$

II where $n$ is 2 or 3, $R^3$ is an alkylene, cycloalkylene, arylene, aralkylene, or cycloalkylalkylene group, X denotes sulphur or oxygen, and $R^4$ is the residue, after removal of $n$ OH or $n$ SH groups, of a compound having $n$ hydroxyl groups or $n$ mercaptan groups directly attached to aliphatic carbon atoms.

$R^3$, the residue of a di-isocyanate, may represent an alkylene hydrocarbon group of 2 to 20 carbon atoms; a mononuclear cycloalkylene group containing 5 or 6 carbon atoms in the ring and having up to 10 carbon atoms in all; a mononuclear arylene hydrocarbon group of up to ten carbon atoms, optionally substituted by chlorine atoms; a dinuclear arylene hydrocarbon group comprising two phenylene groups, linked by a carbon-carbon bond or by a group of formula $$-CH_2-, -C(CH_3)_2-, -CO-, -O-, -S-, \text{ or } -SO_2-$$

and optionally substituted in the rings by methyl or ethyl groups or chlorine atoms; a mononuclear aralkylene hydrocarbon group of up to ten carbon atoms; or a mononuclear cycloalkylalkylene hydrocarbon group of up to 10 carbon atoms. Prepolymers of formula II where $R^3$ denotes a phenylene group, optionally substituted by one or two methyl groups or by 1 to 2 chlorine atoms, are particularly preferred.

Specific examples of compounds containing at least two isocyanate groups per molecule include 1,6-di-isocyanatohexane and its 2,2,4- and 2,4,4-trimethyl homologues, 2,4- and 2,6-di-isocyanatotoluene, 1,5-diisocyanatonaphthalene, bis(4-isocyanatophenyl)methane, 2,4- and 2,6-di-isocyanatomethylcyclohexane, 3-isocyanatomethyl-3,5,5-trimethylcyclohexyl isocyanate, and bis(4-isocyanato-3-chlorophenyl)methane.

The symbols $R^4(X)_n$ preferably denote the residue of a polymeric alcohol having a molecular weight of at least 200 and at most 5000. Examples of suitable polymeric alcohols are:

poly(oxyethylene) glycols, poly(oxypropylene) glycols, poly(tetrahydrofurans), polycaprolactones, alcohols produced by the reduction of dimerised and trimerised unsaturated aliphatic acids of vegetable orgin such as linoleic acid or by the reduction of araliphatic acids obtained by the copolymerisation of such unsaturated fatty acids in the presence of aromatic vinyl compounds (especially styrene), castor oil, and other ricinoleates also hydroxyterminated polyesters obtainable from such alcohols or nonpolymeric alcohols, e.g., ethylene glycol and glycerol, and aliphatic or aromatic polycarboxylic acids such as adipic acid and phthalic acid.

Reaction between the di-isocyanate and the substance containing two or three alcoholic hydroxyl or aliphatic mercaptan group to form the prepolymer is usually carried out in the presence of a catalyst such as a tertiary amine or stannous octanoate. When it is desired to store the blocked prepolymer mixed with the epoxide resin for some while before adding the poly(aminoamide) it is preferred to use an organic compound containing tin or lead, especially organotin compounds such as dibutyltin oxide or dibutyltin dilaurate, rather than a tertiary amine.

Monohydric mononuclear phenols such as phenol itself, optionally substituted by one or two chlorine atoms or by one or two alkyl or alkenyl groups containing up to 8 carbon atoms, are particularly convenient blocking agents.

Mercaptans used as blocking agents may be aliphatic. Good results have been obtained using esters of an aliphatic monomercaptocarboxylic acid, such as thioglycollic acid and 2- or 3-mercaptopropionic acid, with an aliphatic monohydric alcohol of from one to sixteen carbon atoms or an aliphatic dihydric alcohol of from 2 to 16 carbon atoms. Examples of such esters are the thioglycollates and mercaptopropionates of methanol, ethanol, n - and iso -propanol, n-butanol, and 2-ethylhexanol, and the bis(thioglycollates) and bis(mercaptopropionates) of ethylene glycol, poly(oxyethylene) glycols, propylene glycol, and poly(oxypropylene) glycols.

Mercaptan-terminated polysulphides also have given good results. These polysulphides are of the formula

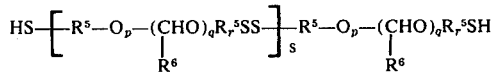

where
R$^5$ denotes an alkylene hydrocarbon group of 2 to 4 carbon atoms,
R$^6$ denotes hydrogen, methyl, or ethyl,
$s$ is an integer of average value such that the molecular weight of the polysulphide is at least 500 and at most 800, and
either $p$ is zero, in which case $q$ and $r$ are each also zero, or $p$ is 1, in which case $q$ is zero or 1 and $r$ is 1.

The compositions employed in the process of this invention where the isocyanate prepolymer is blocked by mercaptan groups are believed to be new.

Particularly preferred blocked isocyanate prepolymers are those obtained from a prepolymer of 2,4- and/or 2,6-di-isocyanatotoluene with an alcohol having an average molecular weight of from 200 to 1500, specifically a poly(oxyethylene) glycol, a poly(oxypropylene) glycol, a poly(tetrahydrofuran), or a polycaprolactone, blocked with phenol, o-, or m-, or p-cresol.

Usually the compositions contain from 15 to 150, and especially 20 to 120, parts by weight of the blocked isocyanate prepolymer per 100 parts by weight of the epoxide resin.

If desired, the compositions may be heated, e.g., at temperatures of from 50° to 150°C to increase the rate of curing, but often they will cure sufficiently rapidly for most purposes at room temperature.

Accelerators for promoting curing of the compositions may also be present. Such accelerators include aliphatic amines containing at least one tertiary amino group and at least one primary amino group, such as N,N-dialkylethane-1,2-diamines and N,N-dialkylpropane-1,3-diamines, especially the N,N-dimethyl and N,N-diethyl derivatives, and also Mannich bases of the formula $$R^7(CH_2NR^8R^8)_y \qquad \text{IV}$$

where
y is an integer of at least 1 and is preferably 3 or 4,
R$^7$ represents the radical or a mononuclear or polynuclear phenol, which may be monohydric or polyhydric, the said radical having y free valencies, and
each R$^8$ represents an alkyl or hydroalkyl group of up to four carbon atoms.

A preferred Mannich base is 2,4,6-tris(dimethylaminomethyl)phenol.

Optionally, plasticisers may be incorporated and these include dibutyl phthalate, dioctyl phthalate, and tricresyl phosphate. There may also be present so-called reactive dilutes, especially monoepoxides such as butyl glycidyl ether, iso-octyl glycidyl ether, phenyl glycidyl ether, cresyl glycidyl ethers, glycidyl acrylate, glycidyl methacrylate, and glycidyl esters of highly branched tertiary, aliphatic monocarboxylic acids. The compositions may also contain fillers, colouring matters, flow-control agents, and flame inhibitors. Suitable extenders and fillers are asphalt, bitumen, glass fibres, ballotini, mica, quartz flour, calcium carbonate, talc, cellulose, kaolin, wollastonite, and colloidal silica having a large specific surface.

The compositions of the present invention may be supplied as a two-part pack, the blocked isocyanate being incorporated in the epoxide resin, or as a three-part pack.

The following Examples illustrate the invention. Unless otherwise indicated, parts are by weight. Temperatures are in degrees Celsius. "Epoxide resin I" denotes a polyglycidyl ether of 2,2-bis(4-hydroxyphenyl)propane having a viscosity at 21° in the range 200 to 400 poises: its epoxide content is 5.1–5.4 equiv./kg.

"Epoxide resin II" denotes a polyglycidyl ether of a phenolformaldehyde novolac, having an epoxide content of 5.5–5.7 equiv./kg.

"Epoxide resin III" denotes diglycidyl tetrahydrophthalate.

"Epoxide resin IV" denotes the tetrakis (N-glycidyl) derivative of bis(4-aminophenyl)methane, having an epoxide content of 7.8–8.2 equiv./kg.

"Polyaminoamide I" denotes a poly(aminoamide) obtained by reaction of diethylenetriamine with a mixture of dimerised and trimerised linoleic acid: its amine value is 210 – 220 mg KOH/g.

"Polyaminoamides II and III" denote poly(aminoamides) similar to "Polyaminoamide I" but having amine values of 290-320 and 350-400 mg KOH/g, respectively.

"Polyaminoamide IV" denotes one made from an oligomerised ethylenically-unsaturated aliphatic acid modified by the incorporation of styrene and having an amine value of 390-430 mg KOH/g.

"Aerosil" (registered Trade Mark) is a silica of large specific surface area.

Shear strengths of joints were determined using aluminum alloy strips 1.63 mm thick obtained under designation "2L 73 Alclad" which had been degreased, pickled by the process prescribed in the British Ministry of Technology Aircraft Process Specification DTD-915B, washed in running water and dried at room temperature ("Alclad" is a registered Trade Mark). Single lap joints 12 × 25 mm were prepared. T-peel strengths were determined by the procedure described in United States Military Specification MMM-A-132. Sheets of "2L 61 Alclad", 0.056 mm thick and 25 mm wide were used.

The prepolymers used were made in the following way. They were, in general, viscous liquids at room temperature but Prepolymer VII was semi-solid, Prepolymer XVIII a waxy solid, a Prepolymer XXI was a brittle glass.

"Tolylene di-isocyanate" denotes a commercially available mixture of 2,4-di-isocyanatotoluene and 2,6-di-isocyanatotoluene.

Prepolymer I

A polyoxypropylene glycol (1125 g) of average molecular weight 750 was dried by heating with toluene (1500 ml) under reflux for 2 hours, the water being removed azeotropically.

Next, tolylene di-isocyanate (525 g) was added at room temperature and the mixture was heated at 60° for 3 hours, then 930 g of a 33.3% dry solution of phenol in toluene, followed by 3.6 g of triethylamine (as catalyst) were added. After the mixture had been heated to reflux for 4 hours, the toluene was removed by distilling off at 100° and 15 mm to leave Prepolymer I as the residue.

Prepolymer II

This was prepared similarly, from 212.5 g of a polyoxypropylene glycol of average molecular weight 425, 174 g of tolylene di-isocyanate, and 103 g of a 33.3 percent dry solution of phenol in toluene.

Prepolymer III

This was prepared in like manner, from 150 g of a polyoxypropylene glycol of average molecular weight 1500, 34.8 g of tolylene di-isocyanate and 21 g of the 33.3 percent solution of phenol in toluene, omitting the triethylamine.

Prepolymer IV

This was prepared as described for Prepolymer I, using, however, a corresponding amount of a 33.3 percent dry solution of m-cresol in toluene.

Prepolymer V this was prepared as described for Prepolymer I, from 250 g of a polyoxyethylene glycol (average molecular weight 1000), 87 g of tolylene di-isocyanate, 155 g of a 33.3 percent dry solution of phenol in toluene, and 0.4 g of triethylamine, the temperature of the mixture being kept at below 30° while the di-isocyanate was added.

Prepolymer VI

This was prepared as described for Prepolymer I, from 187.5 g of a polyoxypropylene glycol of average molecular weight 750, and 105 g of a commercially available mixture of 1,6-di-isocyanato-2,2,4-trimethylhexane and 1,6-di-isocyanato-2,4,4-trimethylhexane, with 1 g of stannous octanoate, then 155 of a 33.3 percent dry solution of phenol in toluene and 0.4 g of triethylamine. The infra-red spectrum of a sample taken at the end of the second heating period showed that all the isocyanate groups had been consumed.

Prepolymer VII

This was prepared as described for Prepolymer I, from 187.5 g of a polyoxypropylene glycol of average molecular weight 750, 125 g of 4,4'-di-isocyanatodiphenylmethane, and 155 g of a 33.3 percent dry solution of phenol in toluene.

Prepolymer VIII

This was prepared as described for Prepolymer II, from 187.5 g of a polyoxypropylene glycol of average molecular weight 750, 11 g of 3-(isocyanatomethyl)-3,5,5-trimethylcyclohexyl isocyanate, and 52 g of a 33.3 percent dry solution of phenol in toluene.

Prepolymer IX

The bis(3-mercaptopropionate) of a polyoxypropylene glycol of average molecular weight 425 (106 g) was heated with 87 g of tolylene di-isocyanate at 60° for 3 hours, then with 155 g of a 33.3 percent dry solution of phenol in toluene in the presence of 0.2 g triethylamine for 7 hours at 115°.

Prepolymer X

A commercially-available ("Adduct A") adduct of a poly(oxytetramethylene) glycol and tolylene di-isocyanate, having an isocyanate content of 9.45 percent, (250 g) was heated with 174 g of a 33.3 percent dry solution of phenol in toluene at 80° for 4 hours and then for one-half hour at 100°. Then the toluene was stripped off as before.

Prepolymers XI–XIII

These were prepared as described for Prepolymer X, the phenol solution being replaced by the corresponding 33.3 percent by weight of a dry solution in toluene of o-cresol, p-chlorophenol, and p-cresol, respectively.

Prepolymers XIV–XV

Adduct A (250 g) was stirred with respectively, 67 g of m-cresol or o-cresol and 0.2 g of triethylamine at room temperature for 2 hours to afford the prepolymers.

Prepolymer XVI

Adduct A (500 g) was mixed with 134 g of a commercially-available mixture of p- and m-cresol and 0.2 g of triethylamine: an exothermic reaction took place, the temperature of the mixture rising to 60°, at which level it was maintained for a further hour by applying heat.

Prepolymer XVII

This was made, as described for Prepolymer XVI, from Adduct A (250 g) and 115 g of 2-ethylhexyl thioglycollate in the presence of 0.2 g of triethylamine.

Prepolymer XVII

A hydroxyl-terminted polyester from polyethylene glycol and adipic acid, of hydroxyl value 76.5 mg KOH/g (125 g) was stirred at 60° while tolylene di-isocyanate (32 g) was added. After the mixture had stirred for 3 hours at 60°, 57 g of a 33.3 percent dry solution of phenol in toluene and 0.2 of triethylamine were added, and the mixture was heated to reflux for 4 hours, and then the toluene was distilled off.

Prepolymer IXX

A hydroxyl-terminated polycaprolactone having a hydroxyl equivalent weight of 262 (131 g) was dried by azeotroping with 250 ml of toluene for 2 hours. Next, 87 g of tolylene di-isocyanate was added at room temperature and the mixture was stirred for 16 hours. Then 59.4 g of o-cresol and 0.2 g of triethylamine were added and, after the mixture had been heated to reflux for 1½ hours, the toluene was stripped off as before.

Prepolymer XX

A commercially-available adduct of a poly(oxytetramethylene) glycol and tolylene di-isocyanate, having an isocyanate content of 4.1 percent (250 g) was heated with 77 g of a 33.3 percent dry solution of phenol in toluene and 0.2 g of triethylamine at 60° for 1 hour, and the toluene was stripped off. The infra-red spectrum of Prepolymer XX indicated that isocyanate groups were absent.

Prepolymer XXI

A commercially-available polyol, having a hydroxyl equivalent weight of 285, based on a vegetable oil (142.5 g) was dried by azeotroping with 200 ml of toluene for half an hour. Next, 87 g of tolylene di-isocyanate was added and the mixture was heated at 60° for 2½ hours. Finally, 155 g of a 33.3 percent dry solution of phenol in toluene was added, and, after the mixture had been heated to reflux for 4 hours, the toluene was stripped off as before.

Prepolymer XXII

A mercaptan-terminated polysulphide (250 g) of average molecular weight about 1000, substantially of the formula

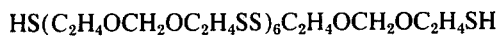

HS(C$_2$H$_4$OCH$_2$OC$_2$H$_4$SS)$_6$C$_2$H$_4$OCH$_2$OC$_2$H$_4$SH was dried by azeotropic removal of water with toluene (250 ml). After tolylene di-isocyanate (87 g) had been added, the mixture was heated at 60° for 3 hours, 54 g of mixed cresols and 0.2 g of triethylamine were added, and the mixture was heated for a further hour at 60°. The toluene was distilled off as before.

Prepolymer XXIII

Adduct A (250 g), 67 g of dried m-cresol, and 0.1 g of di-n-butyltin dilaurate were heated together for 1 hour at 100°: the infra-red spectrum of the product, a viscous, dark straw-coloured liquid, showed the absence of isocyanate groups.

Prepolymer XXIV

This, a viscous brown liquid, was made as described for Prepolymer XXIII, the di-n-butyltin dilaurate being, however, replaced by 0.1 g of di-n-butyltin oxide.

EXAMPLE 1

Compositions were prepared from the components shown in Table I. The epoxide resin was mixed with the quantity of Aerosil shown as "Aerosil I" and the Prepolymer, while another mixture was made from Polyaminoamide I, the quantity of Aerosil shown under "Aerosil II", and the quantity of 2,4,6-tris(dimethylaminomethyl) phenol shown under "Accelerator". The two compositions were then mixed. All the mixtures became tacky except that in Experiment 1.

TABLE I

| Expt. No. | Epoxide resin I | Aerosil I | Prepolymer designation | Prepolymer amount | Polyaminoamide I | Aerosil II | Accelerator | Pot-life at 21° (minutes) |
|---|---|---|---|---|---|---|---|---|
| 1 | 1.8 | 0.2 | — | — | 2.6 | 0.26 | 0.13 | |
| 2 | 1.8 | 0.2 | II | 2 | 2.6 | 0.26 | 0.13 | 4 |
| 3 | 2.25 | 0.25 | III | 2.5 | 4.35 | 0.215 | 0.435 | 7 |
| 4 | 2.67 | 0.33 | V | 2 | 1.75 | 0.08 | 0.17 | 4 |
| 5 | 1.8 | 0.2 | VI | 1 | 2.18 | 0.107 | 0.215 | 60 |
| 6 | 1.8 | 0.2 | VIII | 1 | 2.2 | 0.1 | 0.2 | 43 |
| 7 | 1.8 | 0.2 | VIII | 1 | 2.2 | 0.1 | 0.2 | 60 |
| 8 | 1.36 | 0.14 | IX | 1.5 | 2.0 | 0.1 | 0.2 | 1 |
| 9 | 1.36 | 0.14 | XI | 1.5 | 2.0 | 0.1 | 0.2 | 5 |
| 10 | 1.30 | 0.14 | XII | 1.5 | 2.0 | 0.1 | 0.2 | 0.5 |
| 11 | 1.8 | 0.2 | XIII | 2 | 2.6 | 0.13 | 0.26 | 6–8 |
| 12 | 1.36 | 0.14 | XIV | 1.5 | 1.97 | 0.098 | 0.197 | 4 |
| 13 | 1.36 | 0.14 | XV | 1.5 | 2.0 | 0.1 | 0.2 | 11 |
| 14 | 1.36 | 0.14 | XVII | 1.5 | 2.0 | 0.1 | 0.2 | 1 |
| 15 | 2.67 | 0.33 | XVIII | 2 | 1.75 | 0.08 | 0.17 | <1 |
| 16 | 1.8 | 0.2 | IXX | 1 | 2.0 | 0.1 | 0.2 | 9 |
| 17 | 1.36 | 0.14 | XX | 1.5 | 2.0 | 0.1 | 0.2 | 4 |
| 18 | 3.6 | 0.4 | XXI | 2 | 5.25 | 0.24 | 0.51 | 5 |
| 19 | 1.36 | 0.14 | XXII | 1.5 | 2.0 | 0.1 | 0.2 | 11 |

EXAMPLE 2

Two compositions were prepared, and mixed in equal parts by volume, one composition containing

| 54 g | Polyepoxide I |
| 6 g | Aerosil |
| 40 g | Prepolymer XIV | and the other

| 70 g | Polyaminoamide I |
| 7 g | 2,4,6-tris(dimethylaminomethyl)phenol |
| 3 g | Aerosil |
| 20 g | titanium dioxide |

A 5 g-portion had a useable life of 4 minutes at 21°. Shear strengths of bonds cured at 21° were

| after (hours) | MN²/m² |
|---|---|
| 1 | 2.1 |
| 2 | 2.7 |
| 4 | 6 |
| 4* | 22.5 |
| 7 | 11.4 |
| 24 | 12.8 |
| 168 | 12.8 |

*with 1 hour's post-cure at 100°.

EXAMPLE 3

Mixtures, each containing 100 parts of Polyepoxide I and 40 parts of Prepolymer I, were mixed with 100 parts by weight of Polyaminoamides I, II, or III, and the time taken for the compositions to become tacky at 21° was noted. The compositions were heated for half an hour at 100°, and the strengths of joints were determined.

| Polyaminoamide used | I | II | III |
|---|---|---|---|
| Time to become tacky (minutes₂) | 7 | 20 | 16 |
| Lap shear (MN²/m²) | | | |
| measured at 21° | 25 | 29 | 24 |
| measured at 60° | 12 | 12 | 15 |
| T-peel (N/mm) | 1.8 | 2.4 | 1.0 |

The experiment was repeated, using Polyaminoamide I but varying the amount of Prepolymer I, viz. 20, 40, and 60 parts.

| Prepolymer I | 20 parts | 40 parts | 60 parts |
|---|---|---|---|
| Time to become tacky (minutes) | 9 | 6 | 3 |
| Lap shear (MN²/m²) | | | |
| measured at 21° | 27 | 25 | 31 |
| measured at 60° | 15 | 15 | 17 |
| T-peel (N/mm) | 1.1 | 1.8 | 1.7 |

EXAMPLE 4

The following compositions were prepared and used to prepare joints before : the adhesive was cured by heating at 100° for ½ hour.

| | | | |
|---|---|---|---|
| Epoxide resin I | 70 | — | 100 |
| Epoxide resin II | 30 | — | — |
| Epoxide resin III | — | 100 | — |
| Prepolymer I | 40 | 40 | 40 |
| Polyaminoamide I | 100 | 100 | 100 |
| n-butyl phthalate | — | — | 10 |
| Time to become tacky (minutes) | 3 | 4 | 5 |
| Lap shear (MN²/m²) | | | |
| measured at 21° | 33 | 20 | 23 |
| T-peel (N/mm) | 3 | 4 | 5 |

EXAMPLE 5

In this Example the adhesive properties of a composition used in the method of this invention (A) are compared with those of a conventional epoxde resin - poly(aminoamide) composition (B).

Composition A was made by mixing equal parts by volume of a formulation comprising

| Epoxide resin I | 100 parts |
|---|---|
| Prepolymer XXIII | 100 parts |
| n-butyl phthalate | 10 parts | with one comprising

| Polyaminoamide I | 100 parts |
|---|---|
| 2,4,6-tris(dimethylamino-methyl)phenol | 7.5 parts |
| Calcium carbonate (filler) | 75 parts |

A 5-10 g sample of Composition A became tacky within 10 minutes of the two formulations being mixed.

Composition B was made by mixing equal parts by volume of Epoxide resin I with a formulation comprising

| Polyaminoamide I | 100 parts |
|---|---|
| 2,4,6-tris(dimethylaminomethyl)-phenol | 5 parts |

Joints were prepared with the two Compositions which were left to cure at 22°, the shear strengths being measured at 22° after various curing times.

| Curing time (hours) | Shear strengths (MN/m²) | | | | |
|---|---|---|---|---|---|
| | 4 | 7 | 24 | 96 | 168 |
| Composition A | 10 | 13 | 32 | 30 | 34 |
| Composition B | 0 | 3 | 16 | 17 | 17 |

In another experiment the Compositions were cured by heating at 100° for 30 minutes: the shear strength, measured at 22°, of joints formed with Composition A was 33 MN/m² while that of joints formed with Composition B was 29 MN/m².

EXAMPLE 6

A mixture comprising 1.5 g of Epoxide resin IV, 1.5 parts of Prepolymer XXIII, 2.6 g of Polyaminoamide I, 0.26 g of Aerosil, and 0.13 g of 2,4,6-tris(dimethylaminomethyl)phenol was prepared: it became tacky in 3 minutes, had a pot-life of 5 minutes, and cured within 16 hours to form a strong adhesive bond.

Similar resuts were obtained by replacing the Prepolymer XXIII with an equal weight of Prepolymer XXIV.

EXAMPLE 7

A mixture comprising 1.5 g of Epoxide resin I, 1.5 parts of Prepolymer XXIII, and 1 g of Polyaminoamide IV became tacky within 15 minutes of being prepared and had a pot life of 25 minutes. It, too, cured within 16 hours to form a strong adhesive bond.

We claim:

1. A method for bonding surfaces together which comprises (i) sandwiching between, and in contact with, the surfaces a tacky adhesive composition comprising
   a. an epoxide resin having, per average molecule, more than one 1,2-epoxide group of formula

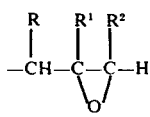

directly attached to oxygen, sulfur, or nitrogen, where either R and $R^2$ each represent hydrogen, in which case $R^1$ denotes hydrogen or methyl, or R and $R^2$ together represent $—CH_2CH_2—$, in which case $R^1$ denotes hydrogen, b. a poly(aminoamide), and c. 15 to 150 parts by weight of a blocked isocyanate prepolymer per 100 parts by weight of the epoxide resin, said prepolymer being of the formula $$(OCNR^3NHCOX)_nR^4$$

where n is 2 or 3, $R^3$ is an alkylene, cycloalkylene, arylene, aralkylene or cycloalkylalkylene group, X denotes sulfur or oxygen, and $R^4$ is the residue, after removal of n OH or N SH groups, of a compound having, directly attached to aliphatic carbon atoms, n hydroxyl groups or n mercaptan groups and having a molecular weight of at least 200 and at most 5000, blocked by monohydric phenol or a mono- or di-mercaptan, and ii. allowing the composition to cure.

2. Method according to claim 1, in which the poly(aminoamide) is present in a quantity sufficient to supply from 0.8 to 1.2 amino-hydrogen atoms per 1,2-epoxide group of the epoxide resin.

3. Method according to claim 1, in which the epoxide resin is a polyglycidyl ether, a poly(β-methylglycidyl) ether, a polyglycidyl ester, or a poly(β-methylglycidyl) ester.

4. Method according to claim 3, in which the epoxide resin is a polyglycidyl ether, having an epoxide content of at least 1.0 epoxide equivalent per kilogram, of 2,2-bis(4-hydroxyphenyl)propane, of a novolac from formaldehyde and either phenol or phenol substituted in the ring by chlorine or by a hydrocarbon alkyl group of from 1 to 4 carbon atoms.

5. Method according to claim 1, in which the poly(aminoamide) is the reaction product, containing on average at least three amino-hydrogen atoms per molecule, of a polyalklenepolyamine having at least four amino-hydrogen atoms per molecule with an at least dicarboxylic acid or an amide-forming derivative thereof.

6. Method according to claim 5, in which the polyalkylenepolyamine is diethylenetriamine, triethylenetetramine, dipropylenetriamine, or tripropylenetetramine.

7. Method according to claim 5, in which the at least dicarboxylic acid is dimerised or trimerised ethylenically-unsaturated aliphatic monocarboxylic acid, or a dimerised or trimerised ethylenicallyunsaturated aliphatic monocarboxylic acid modified by reaction with an aromatic vinyl compound during oligomerisation.

8. Method according to claim 1, in which the isocyanate prepolymer is blocked by means of a monohydric phenol or a mono- or di-mercaptan.

9. Method according to claim 1, in which the blocked isocyanate prepolymer is one obtained by blocking an isocyanate prepolymer which is the reaction product of an organic compound containing two isocyanate groups per molecule with a substance containing two or three hydroxyl or aliphatic mercaptan groups.

10. Method according to claim 1, in which the composition also contains an accelerator which is either an aliphatic amine containing at least one tertiary amino group and at least one primary amino group or is a Mannich base of the formula $$R^7 (CH_2NR^8R^8)_y$$

where y is an integer of at least 1 and at most 4, $R^7$ represents the radical of a mononuclear or polynuclear phenol, which may be monohydric or polyhydric, the said radical having y free valencies, and each $R^8$ represents an alkyl or hydroxyalkyl group of up to four carbon atoms.

* * * * *